(12) United States Patent
Takano et al.

(10) Patent No.: US 7,448,060 B2
(45) Date of Patent: *Nov. 4, 2008

(54) METHOD FOR DETERMINING SIGNAL PATH

(75) Inventors: Hiroshi Takano, San Diego, CA (US); Satoshi Kobayashi, Tokyo (JP); Kazuhiro Suzuki, Kanagawa (JP); Makoto Sato, Tokyo (JP); Yuji Kimura, Tokyo (JP)

(73) Assignees: Sony Corporation, Toyko (JP); Sony Electronics Inc., Park Ridge, NJ (US)

( * ) Notice: Subject to any disclaimer, the term of this patent is extended or adjusted under 35 U.S.C. 154(b) by 898 days.

This patent is subject to a terminal disclaimer.

(21) Appl. No.: 10/816,618

(22) Filed: Apr. 2, 2004

(65) Prior Publication Data

US 2004/0186922 A1    Sep. 23, 2004

(51) Int. Cl.
*H04N 7/18* (2006.01)
*H04N 7/173* (2006.01)
*H04N 7/16* (2006.01)

(52) U.S. Cl. .................. 725/80; 725/133; 725/141

(58) Field of Classification Search ............... 725/80, 725/133, 141
See application file for complete search history.

(56) References Cited

U.S. PATENT DOCUMENTS

| 5,251,205 A | 10/1993 | Callon et al. |
| 5,461,427 A | 10/1995 | Duffield et al. |
| 5,574,965 A | 11/1996 | Welmer |
| 5,598,221 A | 1/1997 | Miyahara et al. |
| 5,666,170 A | 9/1997 | Stewart |
| 5,666,363 A | 9/1997 | Osakabe et al. |
| 5,717,471 A | 2/1998 | Stewart |
| 5,774,193 A | 6/1998 | Vaughan |
| 5,774,195 A | 6/1998 | Miyahara et al. |
| 5,787,259 A | 7/1998 | Haroun et al. |
| 5,802,017 A | 9/1998 | Sato et al. |
| 5,828,418 A | 10/1998 | Lee |
| 5,850,266 A | 12/1998 | Gimby |
| 5,883,621 A | 3/1999 | Iwamura |
| 5,926,228 A | 7/1999 | Jeon et al. |
| 5,933,430 A | 8/1999 | Osakabe et al. |
| 5,940,737 A | 8/1999 | Eastman |
| 5,963,842 A | 10/1999 | Kinugawa |
| 5,973,625 A | 10/1999 | Nam |
| 5,973,748 A | 10/1999 | Horiguchi et al. |
| 6,038,625 A | 3/2000 | Ogino et al. |
| 6,047,002 A | 4/2000 | Hartmann et al. |

(Continued)

FOREIGN PATENT DOCUMENTS

WO    WO 97/37500    10/1997

*Primary Examiner*—Hunter B. Lonsberry
(74) *Attorney, Agent, or Firm*—Blakely, Sokoloff, Taylor & Zafman LLP

(57) ABSTRACT

A method includes integrating information regarding receiving, transmitting and converting capabilities of each device in a network with regard to signal formats, so that a pertinent transmission path can be determined. Such transmission paths can be specified in terms of the order of devices involved in the transmission paths and a signal format between these devices involved. One of the possible transmission paths that match the transmitting device and the transmitted signal format is selected as a pertinent transmission path. The method displays the selected transmission path on a monitor, to assist a user to manually establish a pertinent transmission path.

19 Claims, 7 Drawing Sheets

Device Capability Table

| Node | | |
|---|---|---|
| Node #0 | Reception | ATSC-HD/SD, DSS-HD, Analog |
| | Transmission | None |
| | Conversion | None |
| Node #1 | Reception | DSS-HD/SD |
| | Transmission | DSS-HD/SD, Analog |
| | Conversion | DSS-HD/SD ->Analog |
| Node #2 | Reception | ATSC-HD/SD, DSS-HD/SD, Analog |
| | Transmission | ATSC-HD/SD, DSS-HD/SD, Analog |
| | Conversion | None |
| Node #3 | Reception | DV-SD, Analog |
| | Transmission | DV-SD, Analog |
| | Conversion | None |
| Node #4 | Reception | DV-SD |
| | Transmission | ATSC-SD |
| | Conversion | DV-SD -> ATSC-SD |

U.S. PATENT DOCUMENTS

| | | | |
|---|---|---|---|
| 6,072,983 A | 6/2000 | Klosterman | |
| 6,091,458 A | 7/2000 | Jeon et al. | |
| 6,104,437 A | 8/2000 | Taira et al. | |
| 6,166,774 A | 12/2000 | Plonka | |
| 6,182,224 B1 | 1/2001 | Phillips et al. | |
| 6,216,266 B1 | 4/2001 | Eastman et al. | |
| 6,233,611 B1 * | 5/2001 | Ludtke et al. | 709/223 |
| 6,285,408 B1 | 9/2001 | Choi et al. | |
| 6,285,824 B1 | 9/2001 | Yanagihara et al. | |
| 6,335,762 B1 | 1/2002 | Lee | |
| 6,344,871 B1 | 2/2002 | Liu et al. | |
| 6,349,115 B1 | 2/2002 | Tahara et al. | |
| 6,369,857 B1 | 4/2002 | Balaban et al. | |
| 6,373,527 B1 | 4/2002 | Lee | |
| 6,377,309 B1 | 4/2002 | Ito et al. | |
| 6,380,984 B1 | 4/2002 | Inoue et al. | |
| 6,430,233 B1 | 8/2002 | Dillon et al. | |
| 6,437,834 B1 | 8/2002 | Tagami | |
| 6,496,860 B2 * | 12/2002 | Ludtke et al. | 709/223 |
| 2001/0018718 A1 | 8/2001 | Ludtke et al. | |

* cited by examiner

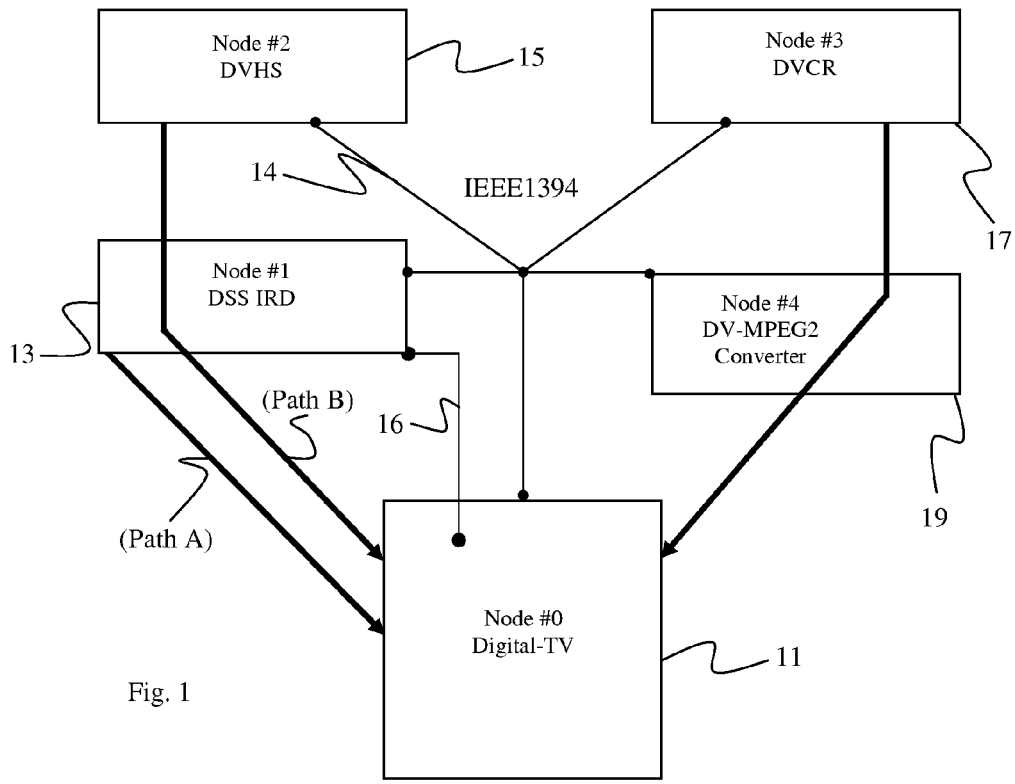

Fig. 1

Device Capability Table

| Node | | |
|---|---|---|
| Node #0 | Reception | ATSC-HD/SD, DSS-HD, Analog |
| | Transmission | None |
| | Conversion | None |
| Node #1 | Reception | DSS-HD/SD |
| | Transmission | DSS-HD/SD, Analog |
| | Conversion | DSS-HD/SD ->Analog |
| Node #2 | Reception | ATSC-HD/SD, DSS-HD/SD, Analog |
| | Transmission | ATSC-HD/SD, DSS-HD/SD, Analog |
| | Conversion | None |
| Node #3 | Reception | DV-SD, Analog |
| | Transmission | DV-SD, Analog |
| | Conversion | None |
| Node #4 | Reception | DV-SD |
| | Transmission | ATSC-SD |
| | Conversion | DV-SD -> ATSC-SD |

Fig. 2

Exemplary Path Table

| Source | Format | Route |
|---|---|---|
| node #0 | N/A | |
| node #1 | DSS-HD | #1 -(Digital) -#0 |
| | DSS-SD | #1 -(Analog) -#0 |
| node #2 | ATSC-HD/SD | #2 -(Digital) -#0 |
| | DSS-HD | #2 -(Digital) -#0 |
| | DSS-SD | #2 -(Digital) -#1 -(Analog) -#0 |
| | Analog | #2 -(Analog) -#0 |
| node #3 | DV-SD | #3 -(Digital) -#4 -(Digital) -#0 |
| node #4 | N/A | |

Fig. 8

| Situation | Step | Action by User | Signal Flow | IRD | DTV | DVHS |
|---|---|---|---|---|---|---|
| Watch DVHS [DSS-SD] | 1 | DTV "Input Select to DVHS" | IR DT DVH DVC MPEG conv. / CH6 CH CH Analog | | Establish P-to-P with DVHS1, Input from CH-X | |
| | 2 | DVHS "PLAY" | IR DT DVH DVC MPEG conv. / CH6 CH CH Analog | | | Play DSS-SD contents, Output TS to CH-X |
| | 3 | | IR DT DVH DVC MPEG conv. / CH6 CH CH Analog | | Recognize SD stream | |
| | 4 | IRD "Input Select to DVHS" DTV "Input" | IR DT DVH DVC MPEG conv. / CH6 CH CH Analog | Overlay P-to-P with DVHS, Input from CH-X, Decode | Displays "Change TV's input to IRD-Analog, Change IRD's input to DVHS-Digital" | |

Fig. 9

METHOD FOR DETERMINING SIGNAL PATH

This application claims the benefit of U.S. Provisional Application No. 60/128,677 filed Apr. 9, 1999; and of U.S. application Ser. No. 09/545,127 filed on Apr. 7, 2000.

BACKGROUND

1. Field of the Invention

The present invention is related to the field of signal transmission.

2. Related Art

As a result of recent developments in digital signal processing technologies, the use of digital interfaces is now becoming a major trend in signal transmission. Standards for digital interfaces, such as IEEE1394, allow various formatted digital signals to be transmitted through a single digital interface.

More specifically, using the IEEE1394 digital interface, digital audio/video devices are connected with each other to form a network of the devices. Digitized audio/video signals are mostly coded or compressed into particular formats, and then transmitted through the digital interface. Such a digital interface allows the digital signals, no matter what format they are in, to be transmitted within the network, and does not regulate or control the transmission path through which the digital signals are being transmitted.

In order to accomplish signal transmission between two devices in a network, one of which transmits a digital signal and the other of which receives the digital signal, the receiving device must be capable of decoding the signal transmitted in a particular format. In other words, both the transmitting and receiving devices have to have a common feature with regard to their coding/decoding capabilities.

It could have been relatively easy to fulfill this requirement when digital signals were coded and transmitted in limited number of formats such as the Digital Video (DV) format. The situation has changed, however. Various types of compression techniques, including Digital Video Interactive (DVI) and Motion Picture Experts Group (MPEG) compression, have been developed and used to achieve higher performance of digital signal transmission. In addition, some of these formats have distinctive modes, such as High Definition (HD) and Standard Definition (SD) modes of MPEG2, in terms of the transmission speed and bandwidth of the signal.

In theory, if every device in a network were to have a common feature with regard to their coding/decoding capabilities, digital signals would be transmitted between the devices through the IEEE1394 digital interface. In practice, however, each device has limited coding/decoding capabilities. As a result, the coding/decoding capabilities of the transmitting and receiving devices may not necessarily correspond to each other.

When such a discrepancy in digital signal formats occurs, it is possible to accomplish signal transmission between the devices in the network by

- using a converter which converts a digital signal format into another format that the receiving device can cope with; or
- decoding a digital signal into analog so that the signal is supplied in an analog format.

To do so, a transmission path in the network has to be reestablished so that it involves an appropriate decoder or converter. It is, however, a complicated task to reestablish a pertinent transmission path taking into account both the format of the signal that a transmitting device provides and the various capabilities of the devices.

Furthermore, an analog interface has to be used to transmit a signal in an analog format; otherwise the analog signal cannot be transmitted successfully. In other words, a determination needs to be made as to which interface is to be used, digital or analog, depending upon the format of the signal transmitted through the interface.

For the foregoing reasons, there is a need for a method and apparatus for determining a transmission path between a transmitting device and a receiving device based on the capabilities of the devices within a network.

SUMMARY

A method includes integrating information regarding receiving, transmitting and converting capabilities of each device in a network with regard to signal formats, so that a pertinent transmission path can be determined. More specifically, the method includes collecting information regarding what formats each of the devices in the network is capable of receiving, transmitting and converting, and producing possible transmission paths between a receiving device and the other devices based on the capability information collected. Such possible transmission paths can be specified in terms of the order of devices involved in the transmission paths and a signal format between these devices involved. Once a transmitting device and a format of a transmitted signal have been identified, one of the possible transmission paths that matches the transmitting device and the transmitted signal format is selected as a pertinent transmission path.

Capability information may be disposed in each of the devices in the network, and the devices may communicate with each other to collect the capability information through a digital interface, such as an IEEE1394 interface.

Also, the method may display the selected transmission path on a monitor, so as to assist a user to manually establish a pertinent transmission path within the network.

According to one aspect of the invention, an apparatus includes a memory for storing information regarding receiving, transmitting and converting capabilities to signal formats. Also included is a memory for storing capability information of other devices. An analog input terminal and a digital input/output terminal coupled to the memory is included. A decoder coupled to the digital input/output interface is included. A controller which refers to contents in the memory for storing information regarding receiving, transmitting and converting capabilities to signal formats and the memory for storing capability information of other devices to produce possible transmission paths based on the capability information stored is included. Also, selection of either the output of the decoder or the analog terminal is provided. A monitor for displaying a selected path to a user may also be included.

BRIEF DESCRIPTION OF THE DRAWINGS

FIG. 1 illustrates an exemplary network of devices coupled with each other via a IEEE1394 digital interface.

FIG. 2 indicates exemplar capability of each device.

FIG. 8 illustrates an exemplary path table.

FIG. 9 illustrates operations of the DVHS, DTV, IRD, and the signal flows between them, in steps.

DETAILED DESCRIPTION

Figure 3:
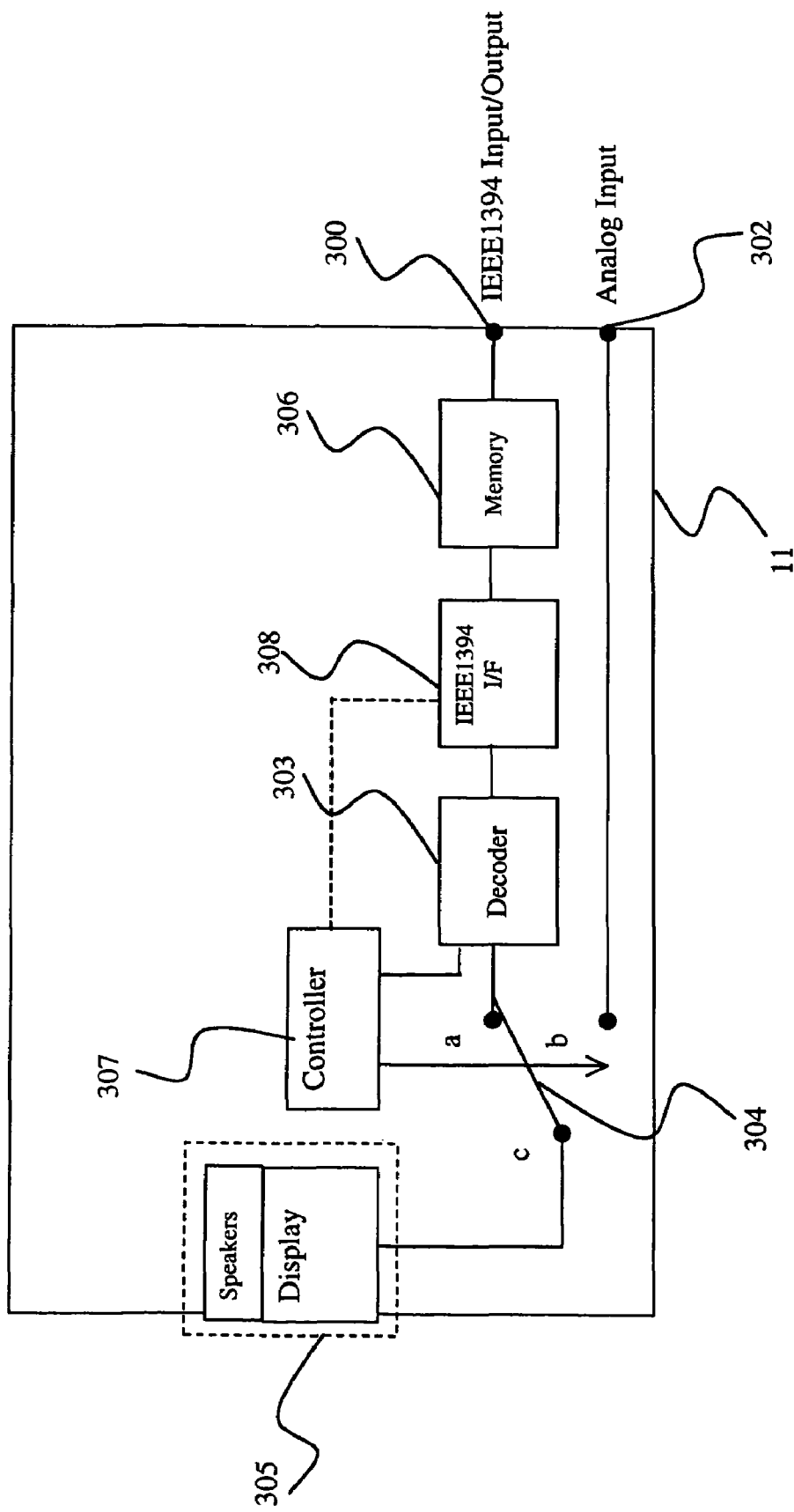
FIG. 3 illustrates an embodiment of the present invention in a block diagram.

Referring to the figures, exemplary embodiments of the invention will now be described. The exemplary embodiments are provided to illustrate the invention and should not be construed as limiting the scope of the invention.

Consider an audio/video system shown in FIG. 1, including a digital TV (DTV) 11, a digital satellite system integrated receiver decoder (DSS-IRD) 13, a digital VHS player (DVHS) 15, a digital video camera (DVCR) 17, and a converter 19 that converts signal formats between the digital video (DV) and MPEG2. These devices are connected with each other via an IEEE1394 digital interface 14 to form a network. Each of the devices has been assigned a node number, which is denoted as "node #n," where n ranges from 0-4 as an example in FIG. 1. Each node is an addressable entity with its own IEEE1394 interface. Each node has an associated 16-bit node ID that differentiates each node from all other nodes.

The IEEE1394 digital interface is based upon the IEEE1394 Standard for a high-performance serial bus, and provides a peer-to-peer interface between various digital peripherals with up to 63 isochronous digital communication channels. Each of the devices in the network is allowed to communicate with the other devices via the IEEE1394 digital interface 14. Accordingly, the devices are theoretically star-connected with each other as shown in FIG. 1. Digital video/audio signals in various digital formats, such as the Digital Video Interactive (DVI) format and MPEG1/2 formats, can be transmitted through this digital interface.

In addition to the digital interface, an analog interface 16 is also provided between the DTV 11 (node #0) and DSS-IRD 13 (node #1), so that an analog signal can be transmitted from the DSS-IRD 13 (node #1) to the DTV 11 (node #0).

A device's capability may include, but is not limited to, (1) receiving and decoding (Reception), (2) coding and transmitting (Transmission), and (3) converting (Conversion). Each of the devices in the network may have different capability, depending upon its nature and scope of use. FIG. 2 shows such capabilities of the devices in a table. In this table, each of the devices is represented by the "node #," and signal formats that the device can handle are listed in terms of its reception, transmission and conversion capabilities.

In FIG. 2, "ATSC" (Advanced Television Systems Committee) is a format for a digital surface broadcasting system in the United States, whereas "DSS" is a digital satellite system. Both of the ATSC and the DSS have two different modes, i.e., "HD" (High definition) and "SD" (Standard Definition). "DV-SD" is a format for a digital video camera with the standard definition. "Analog" means an analog signal format.

For example, the DTV 11 corresponding to "node #0" can receive a signal in ATSC-HD, ATSC-SD, DSS-HD and analog formats, but it has no capability of transmitting and converting a signal. For another example, the DSS-IRD 13, which is "node #1," is capable of receiving a signal in DSS-HD and DSS-SD formats, and transmitting the DSS-HD/SD signals as well as an analog signal, while being able to convert DSS-HD/SD signals into analog. Referring to "node #4," the table indicates that the DV-MPEG2 Converter 19 is capable of converting a DV-SD signal into an ATSC-SD, while receiving a signal in the DV-SD format and transmitting it in the ATSC-SD format.

Each device in the network has specific capability information. In the present embodiment, the memory is provided in configuration ROM (Read Only Memory). One skilled in the art, however, will note that other memory devices may also be used. Since configuration ROM typically does not have much room to store information, e.g. 1024 bytes, keywords or brief information may be stored. Therefore, to store detailed information, additional memory units can be used.

The configuration ROM may contain a list of formats associated with the "Reception," "Transmission," and "Conversion" of particular signals. Such capability information may be stored using a descriptor based upon the IEEE1394 Standard p1212r (1995) 64-bit fixed addressing for example. A descriptor is a leaf (a contiguous information field pointed to by a configuration ROM directory entry) that provides additional information to describe an object associated with a directory entry in configuration ROM.

In the case of DTV, since each device has a capability list, DTV can select compatible devices according to the information in their capability list, which can be transmitted on the IEEE1394 interface 14 in configuration ROM. Once the device is selected, the DTV establishes an isochronous connection. Depending upon the selected device's status, the selected device may output a signal onto the IEEE1394 bus where the DTV picks up the signal. Since dynamic information, such as the current signal format, cannot be used properly if stored in static memory, this type of information may be added to the output signal. The output signal from the selected device has a field to indicate the signal format type. The format type, which may be changed dynamically, depends on the contents or situation of the device. For example, a Digital VHS can play MPEG2, DSS and analog. The DTV keeps monitoring the signal format field to determine whether to process the signal or not. This is a second stage of determination. For instance, if the signal is MPEG2, the controller 307 enables decoder 303 and selects switch "a" to feed the signal to a monitor 305. If the signal is analog, the controller 307 selects switch "b." If the signal is such that it is not compatible for this particular DTV, DV for example, then controller 307 may disable decoder 303.

As shown in FIG. 3, the DTV 11 (node #0) has an IEEE1394 digital input/output terminal 300 as well as an analog input terminal 302, includes a decoder 303 connected to an IEEE1394 interface 308, a switch 304, a monitor 305 having a display and speakers. An analog signal is supplied to the monitor 305 from the decoder 303 when a digital signal is being received, or from the analog input terminal 302 via switch 304.

The DTV 11 also includes a memory device 306 and a controller 307. The memory device may be a ROM, but one skilled in the art should know that other memory devices might also be used. The detailed capability information regarding the DTV 11 may be stored in the memory device 306. The memory device 306 is connected to the digital input/output terminal 300 so that the contents can be read via the IEEE1394 digital interface 14. Each of the devices in the network may be provided with such a memory device containing its detailed capability information.

Figure 4A:
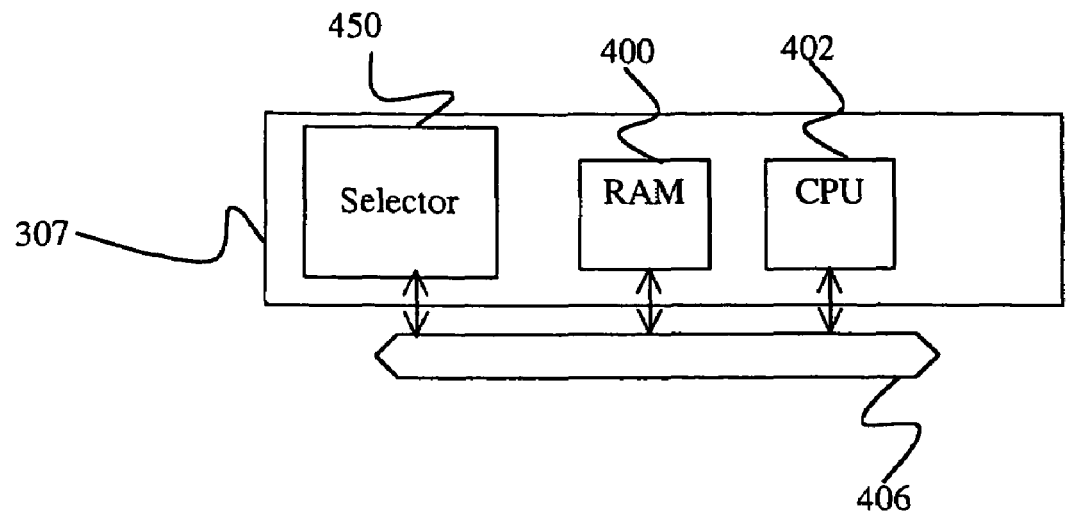
FIG. 4A illustrates a controller shown in FIG. 3.

The controller 307 is used to determine a pertinent transmission path using the capability information of each device in the network. As illustrated in FIG. 4A, the controller 307 includes a CPU 402, a RAM (random access memory) 400, a selector 450 and a data bus 406. It should be noted, however, that one skilled in the art would recognize that other memory storage devices might be used instead of a RAM device.

Figure 5:
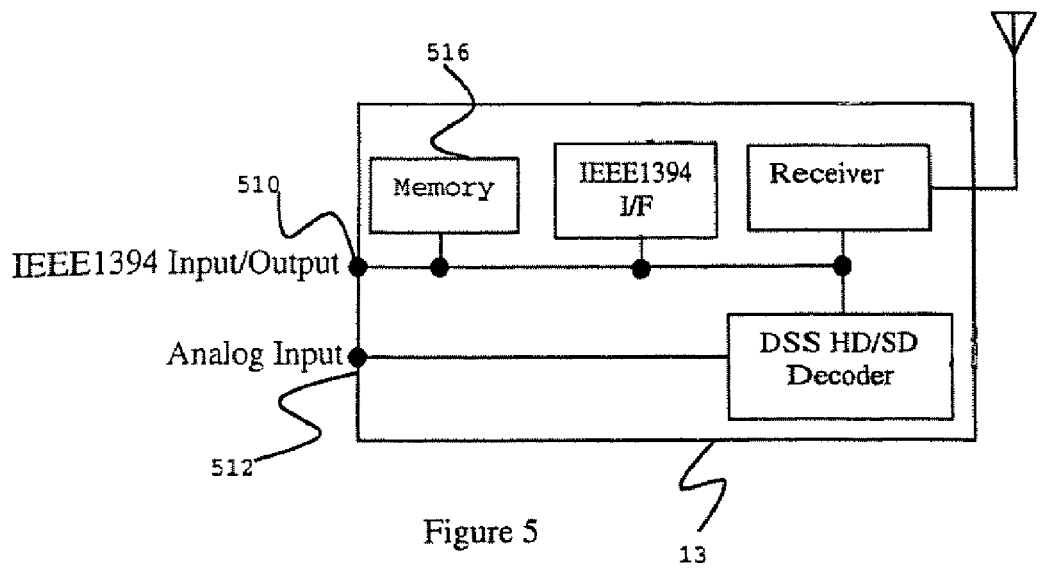
FIG. 5 illustrates an exemplary arrangement of a DSS-IRD in a block diagram.
Figure 6:
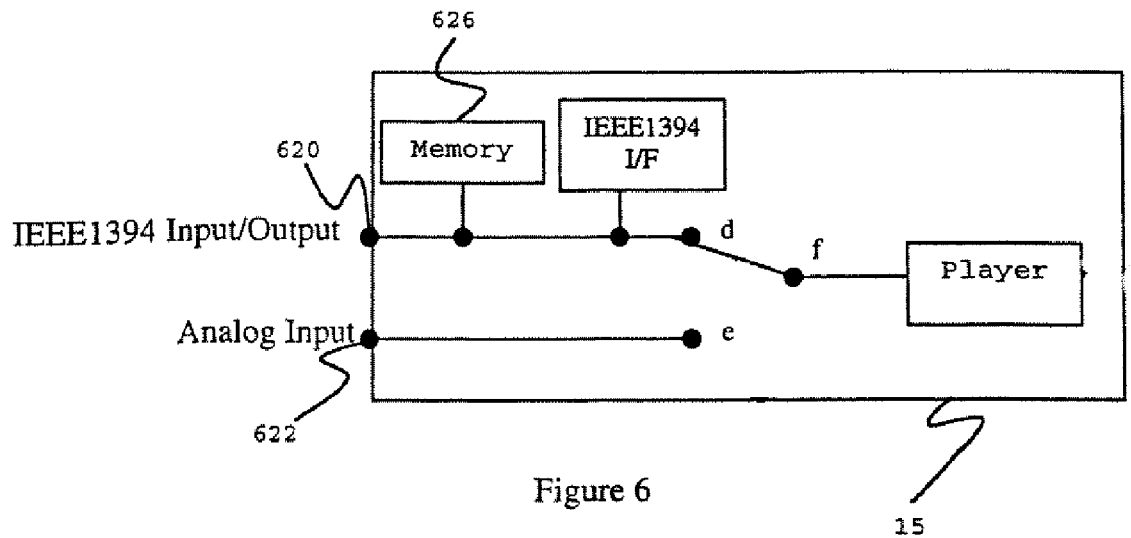
FIG. 6 illustrates an exemplary arrangement of a DVHS in a block diagram.
Figure 7:
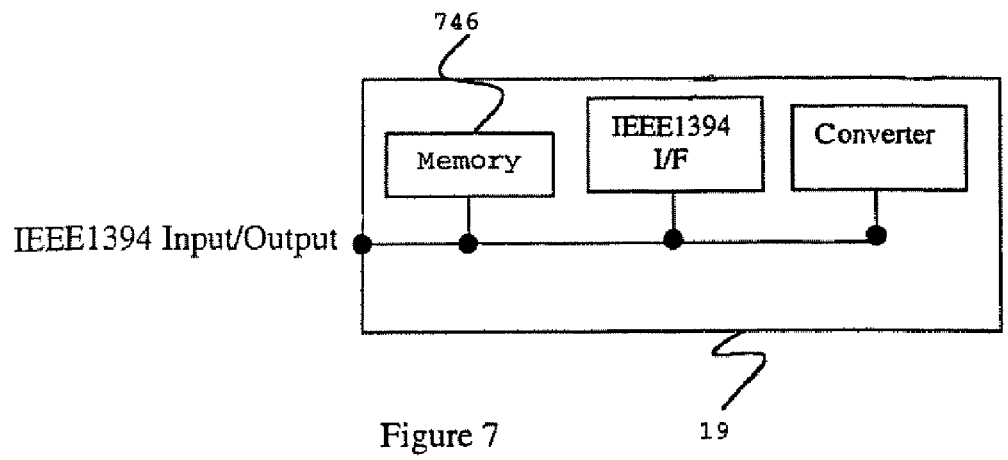
FIG. 7 illustrates an exemplary arrangement of a DV-MPEG2 Converter in a block diagram.

Exemplary arrangements of the other devices are illustrated in FIGS. 5 through 7. As mentioned above, the devices have memory devices 516, 626 and 746, which contain detailed capability information for each device. Connected to the digital input/output terminals, the memory devices can be accessed via the IEEE1394 digital interface 14.

The DTV (node #0) is a receiving device in the network. Once the devices have been connected with each other by the IEEE1394 digital interface 14, the controller 307 refers to the memory of the devices in the network. The capability information in each of the device's memory is collected via the IEEE1394 digital interface 14, and stored in the RAM 400 of the controller 307.

The controller 307 then produces possible transmission paths between the DTV 11 (node #0) and the other devices. FIG. 8 indicates the possible transmission paths based upon the capability information shown in FIG. 2. In FIG. 8, the columns "Source" and "Format" indicate potential transmitting devices (represented by the node #) that could transmit a signal to the DTV (node #0), and formats of the transmitted signals. The column "Routes" shows the devices involved in the possible transmission paths and formats of the signals between these devices.

Consider watching a satellite program in the DSS-HD format. In this case, the DSS-IRD 13 (node #1) is a transmitting device, and the DSS-HD format is the format of the transmitted signal. According to the transmission path table in FIG. 8, a pertinent transmission path will be "#1-<digital>-#0," which means the signal can be directly transmitted between two devices in the digital format. This is indicated as "Path A" in FIG. 1.

Consider watching a program recorded on videotape in DSS-SD format. In this case, the transmitting device is the DVHS 15 (node #2), a pertinent transmission path will be "#2-<Digital>-#1-<Analog>-#0." Namely, the DSS-SD signal is transmitted from the DVHS 15 (node #2) to the DSS-IRD 13 (node #1), which decodes the signal into analog, so that the program is supplied to the DTV 11 (node #0) in an analog format.

Consider watching DV-SD data recorded on DVCR 17 (node #3). A pertinent transmission path will be "#3-<Digital>-#4-<Digital>-#0." In other words, the DV-SD signal is transmitted to the DV-MPEG2 Converter 19 (node #4) to be converted into another digital signal, i.e., ATSC-SD. Then the ATSC-SD output is supplied to the DTV 11 (node #0).

Having determined a pertinent transmission path, the system displays the pertinent transmission path with connection instructions on the monitor 305 of the DTV 11 (node #0) so that the user of the system can manually make corrections for the correct path of the signal to be transmitted.

FIG. 9 illustrates an operation of the transmission system in the case of the Example 1-2 described above.

In FIG. 9, the column "Situation" shows a format of the signal transmitted from the DVHS 15 (node #2). The column "Action by User" indicates the action that a user of the system is taking. The column "Signal flow" indicates a signal flow from the DVHS 15 (node #2) to the DTV 11 (node #0) and the channel through which the signal is being transmitted. Based on the IEEE1394 Standard, the IEEE1394 interface cable 14 provides up to 63 isochronous digital communication channels, some of which are denoted by "CH63," "CH X" and "CH Y" in FIG. 9. The analog Video/Audio cable 16 provides a communication channel for an analog signal. For the case of a digital signal, the channel is assigned dynamically. For the case of an analog signal, unlike the digital signal, once it is connected, there is no dynamic assignment. p The columns "IRD," "DTV" and "DVHS" indicate the operations or workings of the IRD 13 (node #1), DTV 11 (node #0) and DVHS 15 (node #2), respectively.

The operation can be explained as steps, which are performed as follows.

The user of the system has selected the DVHS 15 (node #2) as a source of a signal which is to be received at the DTV 11 (node #0). As a result, an isochronous channel (e.g. CH X) between these devices based upon the IEEE1394 Standard has been established (point-to point connection), and a signal is ready to be transmitted.

The user plays the DVHS 15 (node #2), and a digital signal in the DSS-SD format is transmitted from the DVHS 15 to the DTV 11 (node #0) through the isochronous channel, "CH X," which was established in the previous step. Meanwhile, the DTV 11 (node #0) receives the digital signal and recognizes that it is receiving a DSS-SD digital signal.

According to the transmission path table, a pertinent transmission path is "#2-<Digital>-#1-<Analog>-#0." In other words, the DVHS 15 (node #2) and the DSS-IRD 13 (node #1) should be connected via the digital interface, and the DSS-IRD 13 (node #1) and the DTV 11 (node #0) should be connected via the analog interface. In this particular embodiment, the pertinent transmission path that involved the DSS-IRD 13 (node #1) is displayed on the monitor 305 of the DTV 11.

Referring to the instruction on the monitor 305, the user of the system switches the connection between the DSS-IRD 13 (node #1) and the DTV 11 (node #0) from the digital interface to the analog interface. Accordingly, a pertinent transmission path is established.

As disclosed above, the above embodiment of the present invention determines and displays a pertinent transmission path. Displaying such information can allow the user to establish the transmission path within the system that involves devices with different coding/decoding capabilities.

Another embodiment of the present invention issues commands on the IEE1394 interface 14 so that a pertinent transmission path can be established automatically. Assume that the devices are involved in a network and their coding/decoding capabilities remain the same as the above embodiment.

In the present embodiment, the DTV 11 (node #0) is considered to be a central control device, which manages information regarding pertinent transmission paths and issues the commands to other devices. Some of the other devices could, nevertheless, be such a central control device.

Figure 4B:
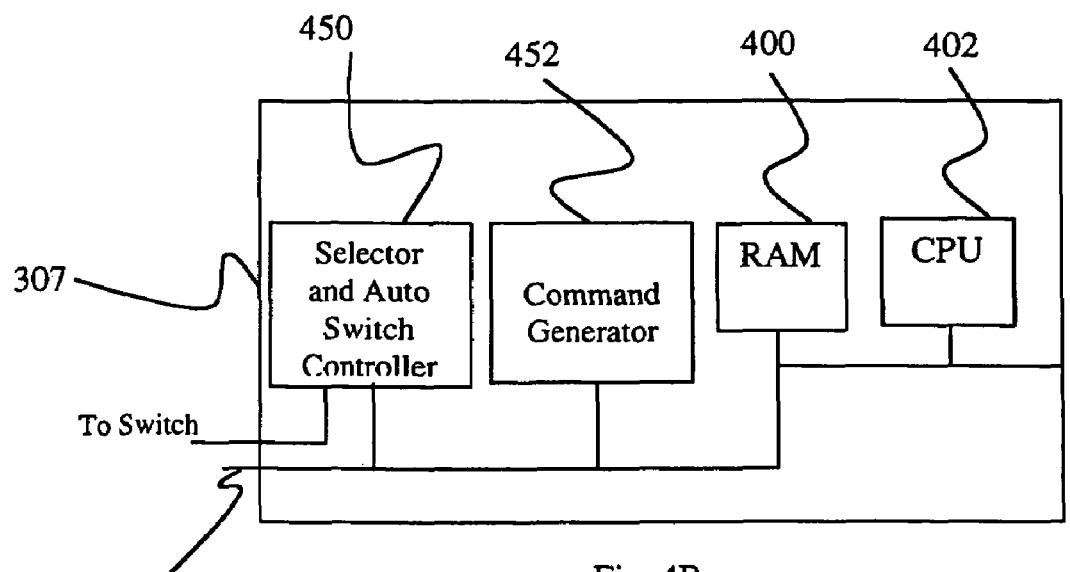
FIG. 4B illustrates another embodiment of a controller in a block diagram.

In the present embodiment, each of the devices in the network has memory provided in configuration ROM (Read Only Memory). One skilled in the art, however, will note that other memory devices may also be used instead of, or together with, a configuration ROM. In addition to configuration ROM, the DTV 11 (node) #0) has a modified controller as illustrated in FIG. 4B. The controller 307 now includes a command generator 452. Once the signal is received, a command is issued on the IEEE1394 interface 14 when a format of the transmitted signal changes. As a result of the issued command, switching to a second input terminal of the receiver from the first input terminal to receive the transmitted signal is now handled automatically by a switch controller.

More specifically, the method includes selecting an input terminal of the receiver, either a digital input terminal or an analog input terminal, when the command is issued.

In this method, a command may be issued when the transmitted signal format changes from a digital format to an analog format. The receiver will then select its analog input terminal to receive the incoming signal when the command is received. Also, a command may be issued when the transmitted signal format has changed from an analog format to a digital format, so that the receiver will select the digital input terminal according to the second command.

Figure 10:
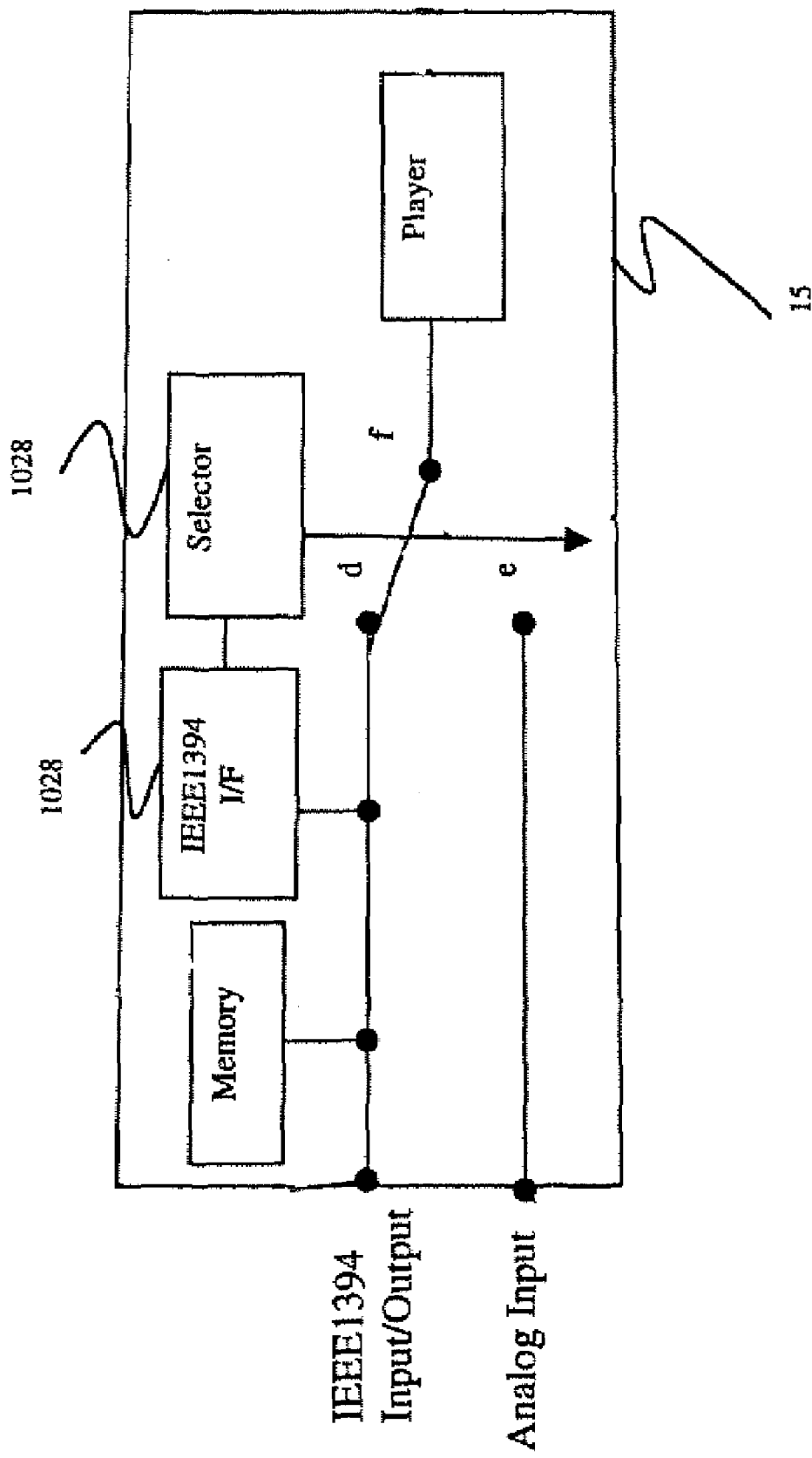
FIG. 10 illustrates another exemplary arrangement of a DVHS.

The other devices also include selectors that select their input/output terminals according to the commands so as to establish a pertinent transmission path. FIG. 10 illustrates an example of a DVHS 15 including a selector 1028.

Considering that the DTV 11 (node #0) is a receiving device, possible transmission paths are the same as described in FIG. 8. Since such transmission paths can be derived from the capability information shown in FIG. 2 in the same manner as the first embodiment, the explanation regarding the process to obtain the possible transmission paths is omitted.

Consider that the DSS-IRD 13 (node #1) has been designated as a transmitting device that transmits a DSS-HD signal. In this case, a pertinent transmission path is "#1-<digital>-#0", according to FIG. 8. This is indicated as "Path A" in FIG. 1.

The DTV 11 (node #0) issues a command via the command generator 452 on the IEEE1394 interface 14 to the DSS-IRD (node #1). The DSS-IRD 13 now has a selector to switch the output from the analog terminal 512 to the IEEE1394 terminal 510. Therefore, these two devices are connected via the IEEE1394 interface 14, automatically.

Assume that the user has designated the DVHS 15 (node #2) as a transmitting device. According to FIG. 8, a pertinent transmission path is "#2-<Digital>-#1-<Analog>-#0" (PATH B in FIG. 1). This means that the DSS-SD signal should be transmitted from the DVHS 15 (node #2) to the DSS-IRD 13 (node #1), which decodes the signal into analog, and the analog signal is supplied to the DTV 11 (node #0) from the DSS-IRD 13 (node #1).

The DTV 11 (node #0) then issue commands via the command generator 452 so that the DVHS 15 (node #2) (now having a selector to switch to either the analog terminal 622 or the IEEE1394 terminal 620) switches to the IEEE1394 terminal 620, and is connected with the DSS-IRD 13 (node #1) via the IEEE1394 interface 14 and the DSS-IRD 13 (node #1) switches automatically to the analog terminal 512, which is now connected with the DTV 11 (node #0) via an analog interface 16.

According to this embodiment of the present invention, devices in the network can be in use even though transmitting and receiving devices do not have common features with regard to their coding/decoding capabilities. Because the system is capable of determining and establishing a pertinent transmission path, a signal can also be transmitted from one device to another even if the format of the signal changes during the course of the transmission.

The embodiments of the invention described above are, of course, subject to other variations in structure and implementation. For instance, additional devices may be inserted between various nodes, terminals, and devices in the above embodiments without materially changing their overall function. In general, the scope of the invention should be determined not by the embodiments illustrated but by the appended claims and their legal equivalents.

What is claimed is:

1. A method comprising:
preparing capability information of each of a plurality of devices with regard to signal formats, said capability information including receive, transmit and conversion capabilities for each of the plurality of devices with regard to signal formats;
designating a device that ultimately receives a signal;
collecting and storing the capability information of every one of the plurality of devices by a central controller in one of said plurality of devices;
producing a plurality of possible transmission paths between the receiving device and other devices based on the capability information collected and stored;
identifying a device that transmits a signal and a format of the transmitted signal by monitoring a signal format field in said signal to determine whether to process said signal; and
selecting one of the plurality of possible transmission paths that matches the transmitting device and the transmitted signal format for a transmission path.

2. The method of claim 1, wherein the possible transmission paths are specified in terms of the order of devices involved in the transmission paths and a signal format between the devices involved.

3. The method of claim 1, wherein the producing step comprises:
seeking other devices capable of transmitting a signal in the same formats as the receiving device is capable of receiving.

4. The method of claim 2, wherein the producing step comprises
seeking other devices that are capable of converting a signal into the formats that the receiving device is capable of receiving;
ordering the converting devices before the receiving device;
seeking other devices that are capable of transmitting a signal in the format that the converting devices are capable of converting from; and ordering the transmitting devices before the converting devices.

5. The method of claim 1, wherein the capability information for each of the plurality of devices is originally possessed in each of the plurality of devices.

6. The method of claim 5, wherein
the plurality of devices communicate with each other to collect the capability information.

7. The method of claim 1, further comprising:
displaying the selected transmission path on a monitor.

8. The method of claim 7, wherein said displaying step comprises displaying connection instructions on the monitor.

9. A method comprising:
preparing capability information of each of a plurality of devices with regard to signal formats, said capability information including receive, transmit and conversion capabilities for each of the plurality of devices with regard to signal formats;
designating a device that ultimately receives a signal;
collecting and storing the capability information of every one of the plurality of devices by a central controller in one of said plurality of devices;
producing a plurality of possible transmission paths between the receiving device and other devices based on the capability information collected and stored;
identifying a device that transmits a signal and a format of the transmitted signal by monitoring a signal format field in said signal to determine whether to process said signal;
selecting one of the plurality of possible transmission paths that matches the transmitting device and the transmitted signal format for a transmission path;

displaying the selected transmission path on a monitor; and displaying connection instructions on the monitor.

10. The method of claim 9, wherein the possible transmission paths are specified in terms of the order of devices involved in the transmission paths and a signal format between the devices involved.

11. The method of claim 9, wherein the producing step comprises:

seeking other devices capable of transmitting a signal in the same formats as the receiving device is capable of receiving.

12. The method of claim 9, wherein the producing step comprises seeking other devices that are capable of converting a signal into the formats that the receiving device is capable of receiving;

ordering the converting devices before the receiving device;

seeking other devices that are capable of transmitting a signal in the format that the converting devices are capable of converting from; and ordering the transmitting devices before the converting devices.

13. The method of claim 9, wherein the capability information for each of the plurality of devices is originally possessed in each of the plurality of devices.

14. The method of claim 13, wherein the plurality of devices communicate with each other to collect the capability information.

15. A method comprising:

preparing capability information of each of a plurality of devices, the capability information including receive, transmit and conversion capabilities for each of the plurality of devices with regard to signal formats;

designating a destination device that ultimately receives a signal;

collecting and storing the capability information of each of the plurality of devices;

producing a plurality of possible transmission paths between the destination device and other devices of the plurality of devices based on the capability information collected and stored;

identifying a transmitting device that transmits a signal and a format of the signal being transmitted; and selecting one of the plurality of possible transmission paths that matches the transmitting device and the transmitted signal format for a transmission path.

16. The method of claim 15, wherein the plurality of possible transmission paths are specified in terms of an order of the plurality of devices involved in the transmission paths and a signal format between the plurality of devices involved.

17. The method of claim 15, wherein the capability information for each of the plurality of devices is originally possessed in each of the plurality of devices.

18. The method of claim 15, wherein the plurality of devices communicate with each other to collect the capability information.

19. The method of claim 15, further comprising:

displaying the selected transmission path on a monitor.

* * * * *